(12) United States Patent
Stephenson et al.

(10) Patent No.: US 6,948,682 B1
(45) Date of Patent: Sep. 27, 2005

(54) LIFTING BODY AIRCRAFT AND REENTRY VEHICLE

(76) Inventors: Jon Stephenson, 101 Ormond St., Apt. A1, LaPlace, LA (US) 70068; John C. Bayer, 7410 Bluebonnet Blvd., #207B, Baton Rouge, LA (US) 70884; James G. Froeschner, 925 Lakeshore Dr., Cuba, MO (US) 65453

( * ) Notice: Subject to any disclaimer, the term of this patent is extended or adjusted under 35 U.S.C. 154(b) by 0 days.

(21) Appl. No.: 10/458,142

(22) Filed: Jun. 10, 2003

(51) Int. Cl.$^7$ .............................. B64C 7/00
(52) U.S. Cl. ...................... 244/36; 244/160
(58) Field of Search .................. 244/36, 160, 162, 244/118.1, 118.5

(56) References Cited

U.S. PATENT DOCUMENTS

| | | | |
|---|---|---|---|
| 3,276,722 A | | 10/1966 | Eggers, Jr. et al. |
| 3,289,974 A | * | 12/1966 | Cohen ..................... 244/162 |
| 3,570,789 A | * | 3/1971 | Rainey .................... 244/90 R |
| 3,761,041 A | * | 9/1973 | Putman ..................... 244/13 |
| 4,149,688 A | * | 4/1979 | Miller, Jr. ................. 244/12.4 |
| 5,568,903 A | * | 10/1996 | Pena et al. ................. 244/140 |
| 6,076,771 A | | 6/2000 | Bailey et al. |

OTHER PUBLICATIONS http://seds.lpl.arizona.edu/ssa/docs/Space.Shuttle/cargo.shtml.*
http://liftoff.msfc.nasa.gov/Shuttle/Spacelab/sl–module.html.*
http://www.enchantedlearning.com/devices/spaceshuttle/label/labelanswers.shtml.*
http://www.science.ksc.nasa.gov/shuttle/technology/sts–newsref/spacelab.html.*
http://www.af.mil/factsheets/factsheet_print.asp?fsID=83&page=1.*
http://www.dfrc.nasa.gov/Newsroom/FactSheets/FS–010–DFRC.html.*
NASA HL–10 Photos.*
Unknown, U.S. Centennial of Flight Commission, Early Reentry Vehicles: Blunt Bodies and Ablativ.
Aug. 1985, Wing Magazine, Flying Flatirons (pp. 11–21).
X–38 Photo Gallery Contact Sheet, http://ww.dfrc.nasa.gov/gallery/photo, Jan. 31, 1999.
Photograph of Lifting Bodies (X–24A/M2–F3/HL–10), http://www.dfrc.nasa.gov/gallery/photo/Fleet/Small/, Jul. 14, 1999.
Photographs of Lifting Body, http://ww.patprojects.org/LiftingBody/images/, Jul. 14,1999.

* cited by examiner

*Primary Examiner*—Peter M. Poon
*Assistant Examiner*—Timothy D. Collins
(74) *Attorney, Agent, or Firm*—Roy, Kiesel, Keegan & DiNicola

(57) ABSTRACT

A lifting body aircraft suitable for atmospheric flight and/or as a reentry vehicle. The craft has a substantially flat upper surface, a lower surface with a doubly convex first section and a flat sloping second section. The doubly convex first section allows the craft to have its center of gravity forward of its longitudinal center line. The flat sloping second half of the lower surface and the substantially flat upper surface form the aft end of an airfoil. A pair of vertical stabilizers enhance stability and include rudders which, along with a pair of elevons, provide steerage. The craft may glide or it may have an engine or rockets for thrust. The result is an extremely stable lifting body design that is well suited for launch or conventional take off, insertion, orbital operations, reentry, atmospheric flight, and conventional landings.

53 Claims, 9 Drawing Sheets

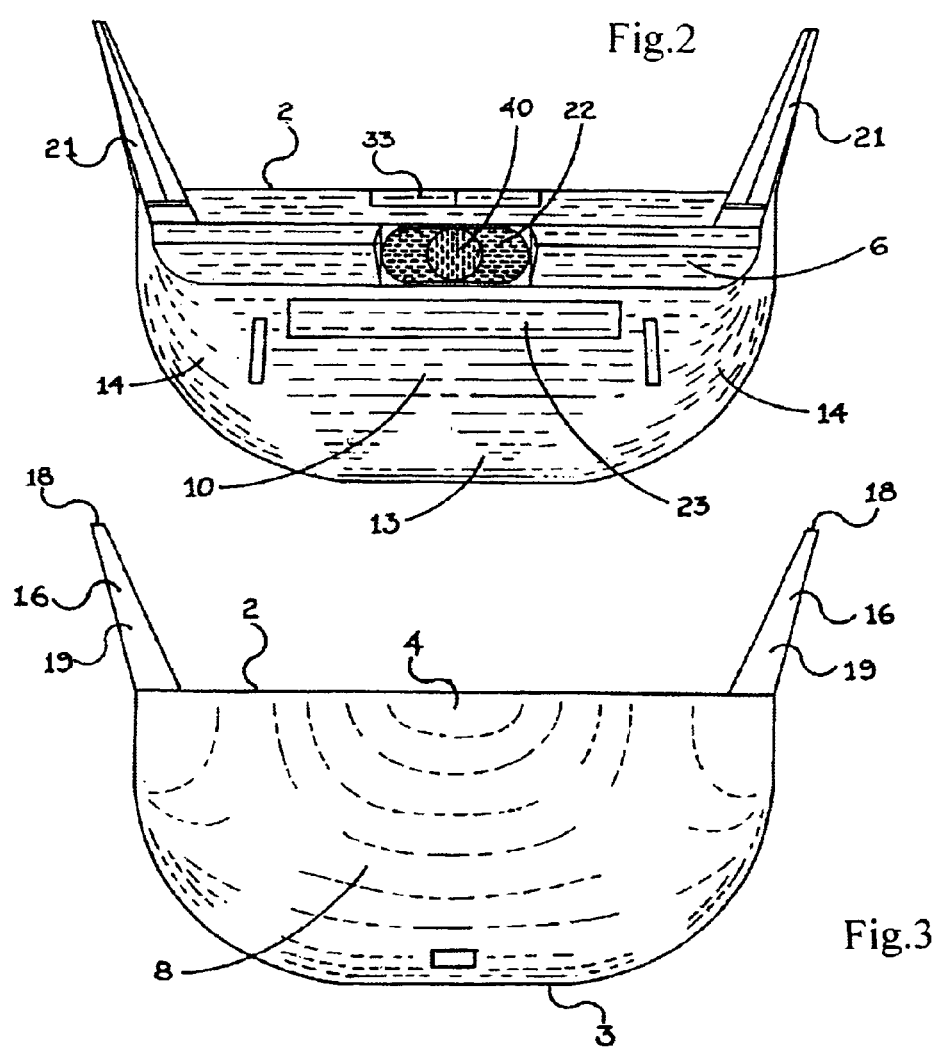

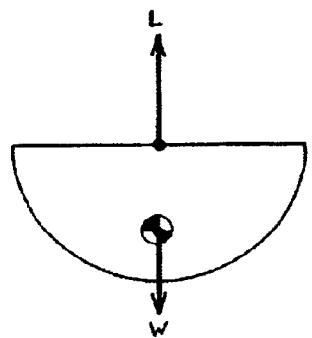
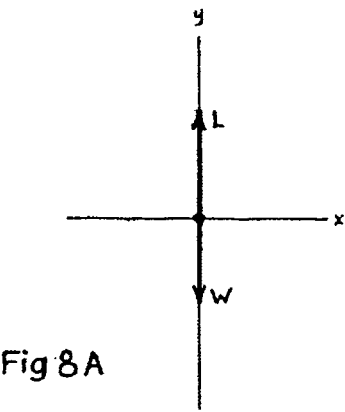
Fig 8A
$F_R = L - W$
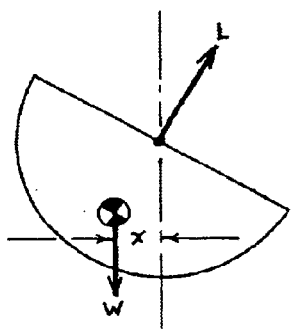
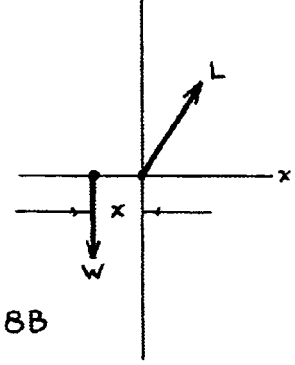
Fig 8B
$M = X(L_y + W)$
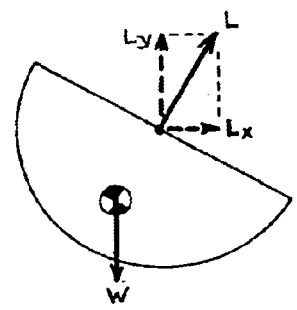
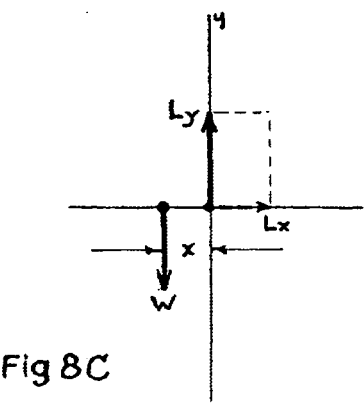
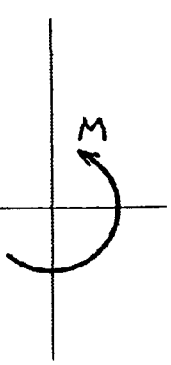
Fig 8C

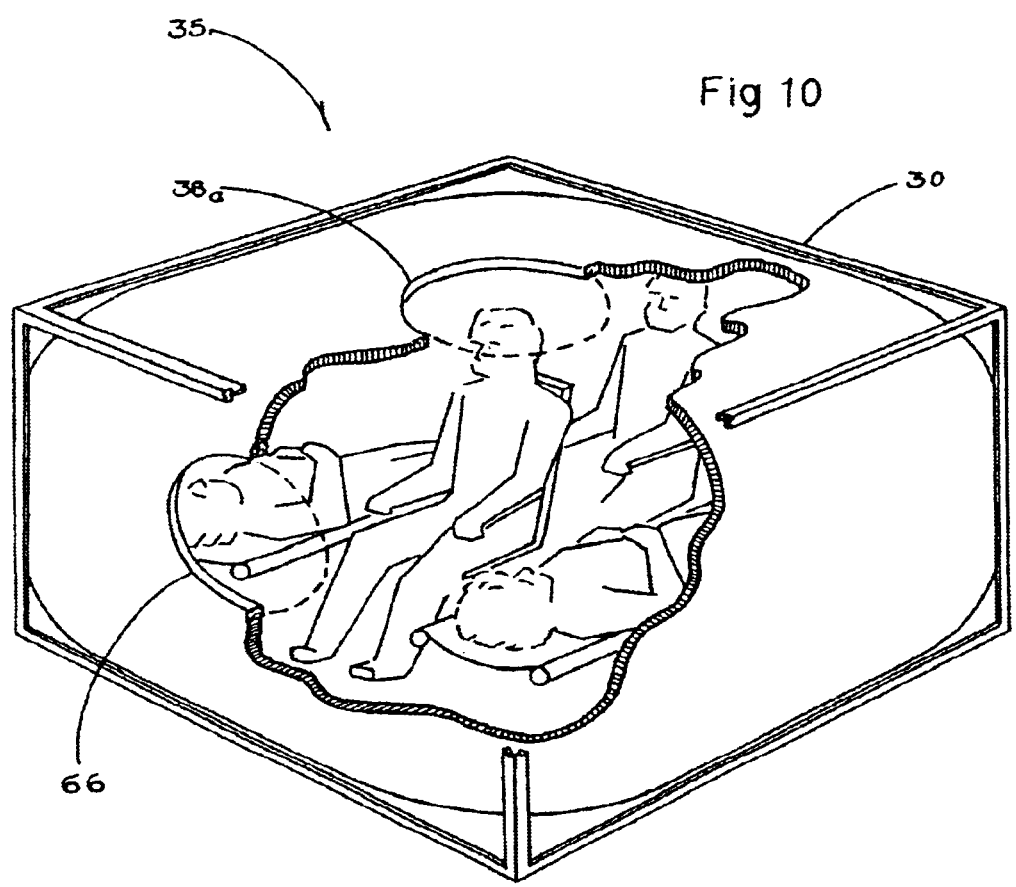

LIFTING BODY AIRCRAFT AND REENTRY VEHICLE

BACKGROUND OF THE INVENTION

1. Field of the Invention

The invention relates to aircraft in general and to lifting body aircraft in particular.

2. Prior Art

Lifting body aircraft are known in the art. The theory was pioneered by Dr. Alfired J. Eggers, Jr. who discovered that lift could be generated by modifying the shape of a blunt nose cone reentry vehicle. Eggers'theories led to several NASA and U.S. Air Force experimental aircraft in the 1960's and 1970's, namely the M2-F1, the M2-F2, the M2-F3, HL10, X-24A and X-24B. Eggers'lift concept can also be seen in U.S. Pat. No. 3,276,722. All of these craft generate lift with the fuselage of the aircraft only; i.e. without a wing.

The Eggers craft can generally be described as conical sections. They have a blunt nose, swept back sides, round bottoms, and generally flat tops. As the crafts move through air, the high profile of their curved lower surfaces causes a significant amount of air to be displaced up and around the body of the vessel. This does two things. First, pressure is being exerted on the air mass at the interface with the hull. In response to this pressure, the air is compressed and it is displaced, up and around the lower surface of the craft. Air has viscosity, so it resists both the compression and the displacement. The greater the speed at which the craft is moving, the greater the resistance of the air. This resistance of the air is transmitted as force to its surroundings. Thus, the air pressure below the craft will be increased.

Second, a lift body is designed to move forward with its nose slightly elevated. As the craft moves forward, the craft will displace air, rarefying (reducing the density of) the air above the craft. This will result in a decrease in pressure above the upper surface of the lifting body.

The difference between the increased pressure generated on the lower surface and the decreased pressure at the upper surface will result in an overall upward force on the lifting body. This upward force is lift.

Although lift bodies were previously known, limited maneuverability and stability of many of the craft in atmospheric flight created significant challenges. Moreover, the inventors are not aware of any that were ever able to takeoff under their own power. Rather, previous lifting bodies were all believed to carried aloft by a winged aircraft and released to perform rocket powered maneuvers and then to return to earth at a glide. Accordingly, a lifting body craft meeting the following objectives is desired.

OBJECTS OF THE INVENTION

It is an object of the invention to provide a lift body aircraft that maximizes lift.

It is another object of the invention to provide a lift body aircraft that minimizes drag.

It is another object of the invention to provide a lift body aircraft that maximizes flight stability.

It is still another object of the invention to provide a lift body aircraft that minimizes the tendency of the aircraft to pitch up.

It is still another object of the invention to provide a lift body aircraft that is readily maneuverable.

It is yet another object of the invention to provide a lift body aircraft that may be used as a reentry vehicle for space flight.

It is still another object of the invention to provide a lift body aircraft optimized for atmospheric flight and space operations.

It is still another object of the invention to provide a lift body aircraft that employs modular internal component systems.

It is still another object of the invention to provide a lift body aircraft that is readily adaptable to a wide range of mission objectives.

It is yet another object of the invention to provide a lift body aircraft that can be landed either under power or "dead stick."

It is still another object of the invention to provide a lift body aircraft suitable for landing on unimproved surfaces.

It is still another object of the invention to provide a lift body aircraft suitable for landing on water.

It is still another object of the invention to provide an airframe for a lift body aircraft formed of a wound carbon construction.

It is still another object of the invention to provide an airframe for a lift body aircraft which maximizes strength and minimizes interfaces.

It is still another object of the invention to provide a lift body aircraft having a single component aeroshell.

SUMMARY OF THE INVENTION

The invention comprises a lift body aircraft. The aircraft has an upper surface that is generally flat and a lower surface that is doubly convex in the forward portion but which has a flat bottom over its aft half. The double convexity allows the center of gravity of the aircraft to be positioned forward of its longitudinal center line, giving the craft the inherent flight stability of a "shuttlecock."

At the aft end of the craft, the lower surface and the upper surface will come together to form the aft portion of an airfoil, whereby drag at the rear of the craft may be minimized. The craft is also preferably provided with a pair of vertical stabilizers which serve as winglets to minimize "wingtip" vortexes: turbulent flow of air where the air flowing beneath the craft spills over into the air flow above, the craft. The vertical stabilizers may be provided with rudders to assist in controlling the craft. Elevons may also be provided at the aft end of the craft for additional control.

The craft may be used for atmospheric flight. However, the design is also suited for use as a reentry vehicle for space flight. The broad doubly convex nose section provides a wide surface over which the heat and forces inherent in reentry may be dissipated. In the initial stages of reentry, the superheated air through which the craft will pass will be rendered a plasma and will only provide minimal lift in the conventional sense. However, once the craft has slowed sufficiently it will reestablish sufficient lift to be used to fly or glide to a landing at a site of the pilot's choosing, or continue to perform mission objectives which require extended loiter time.

The inventors contemplate that the airframe will be of a single component aeroshell, with modular interior component systems. These internal component systems may include crew modules, control modules, supply modules, cargo modules, satellite modules, medical modules, evacuation modules, science or laboratory modules, propulsion modules, fuel modules, and sub systems modules, or other payload modules. All modules will preferably be designed to be readily installed, removed, and exchanged using standardized mating points and mating adapters. These will allow the vehicle to be efficiently serviced and quickly adapted to changing mission objectives, whether on the ground, in the field, or even on orbit.

BRIEF DESCRIPTION OF THE FIGURES

FIG. 2 is an end view of a preferred embodiment of the invention.

FIG. 3 is a front view of a preferred embodiment of the invention.

FIG. 8A is a representative aft end profile view of a preferred embodiment of the invention in flat level flight with the lift vector "L" and gravity induced weight vector "W" shown relative to the craft and then resolved.

FIG. 8B is a representative aft end profile view of a preferred embodiment of the invention shown in FIG. 8A in a roll with the lift vector "L" and gravity induced weight vector "W" shown relative to the craft and then translated onto x-y axes to illustrate displacement.

FIG. 8C is a representative aft end profile view of a preferred embodiment of the invention shown in FIG. 8B with the lift vector "L" resolved into its horizontal and vertical components and showing the resulting restorative roll moment "M."

FIG. 10 is a perspective partial cutaway view of a preferred embodiment of a pressurized habitation module, configured for use as an emergency medical evacuation module.

DETAILED DESCRIPTION OF THE BEST MODE

Figure 1:
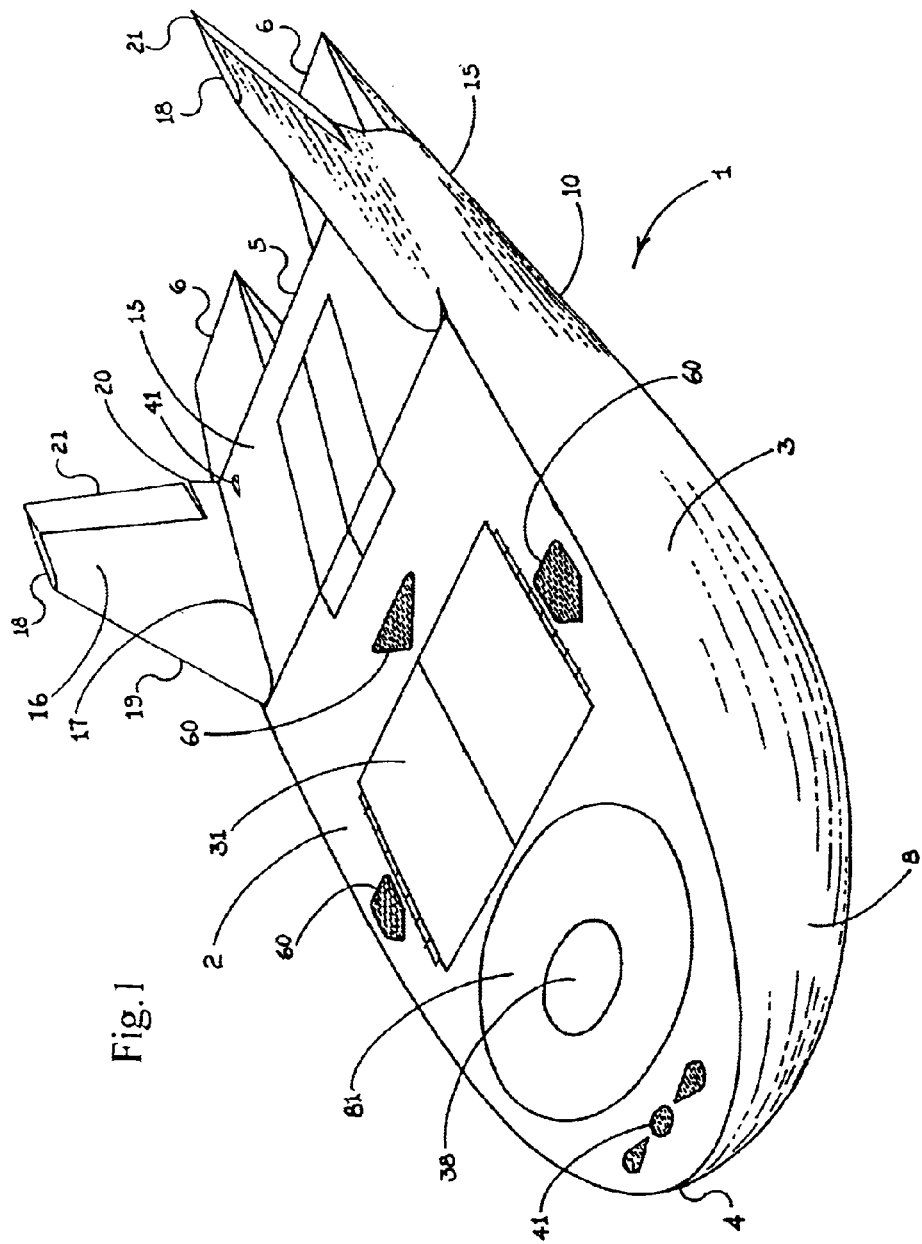
FIG. 1 is a perspective view of a preferred embodiment of the invention.
Figure 4:
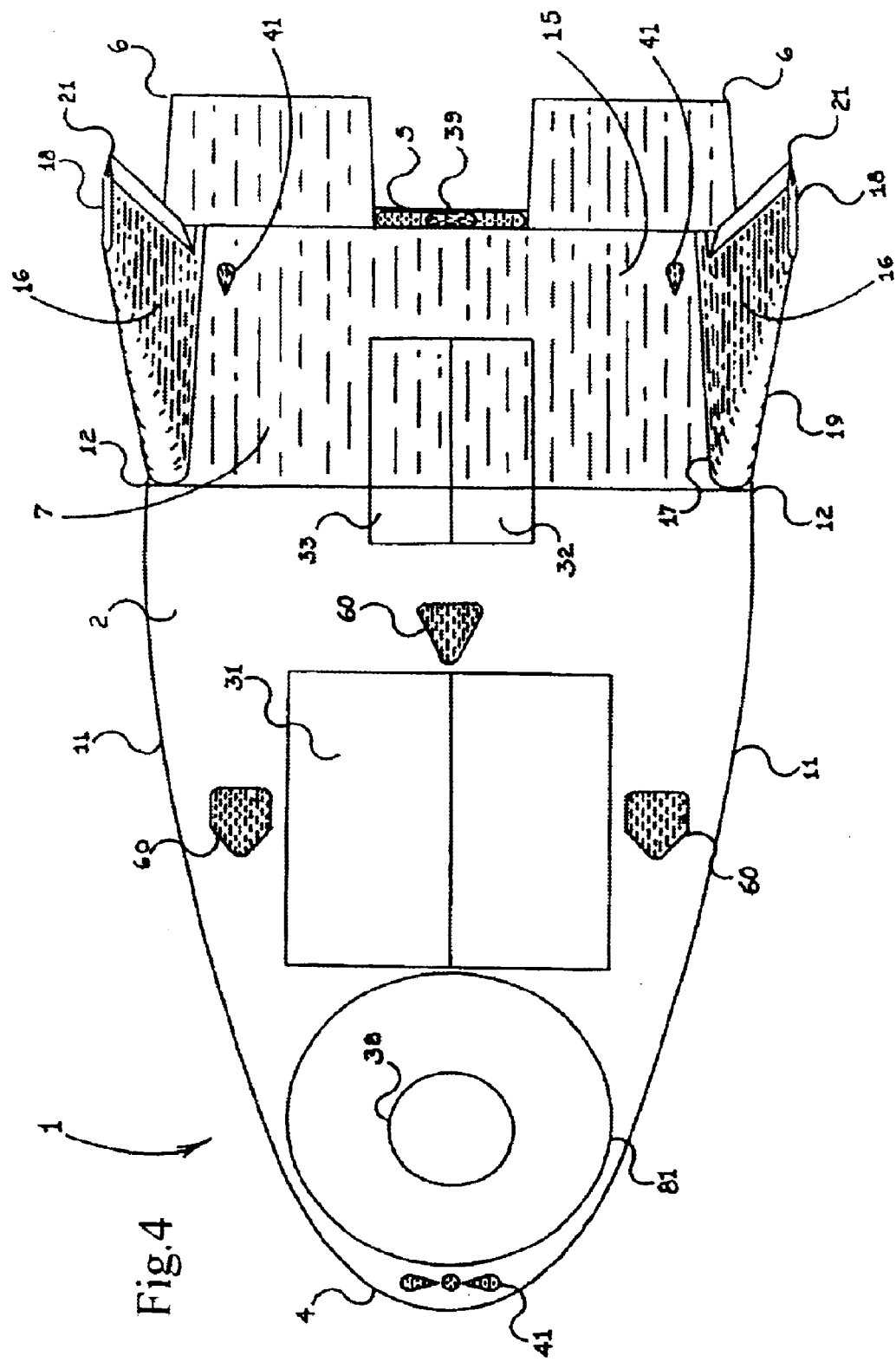
FIG. 4 is a top view of a preferred embodiment of the invention.
Figure 5:
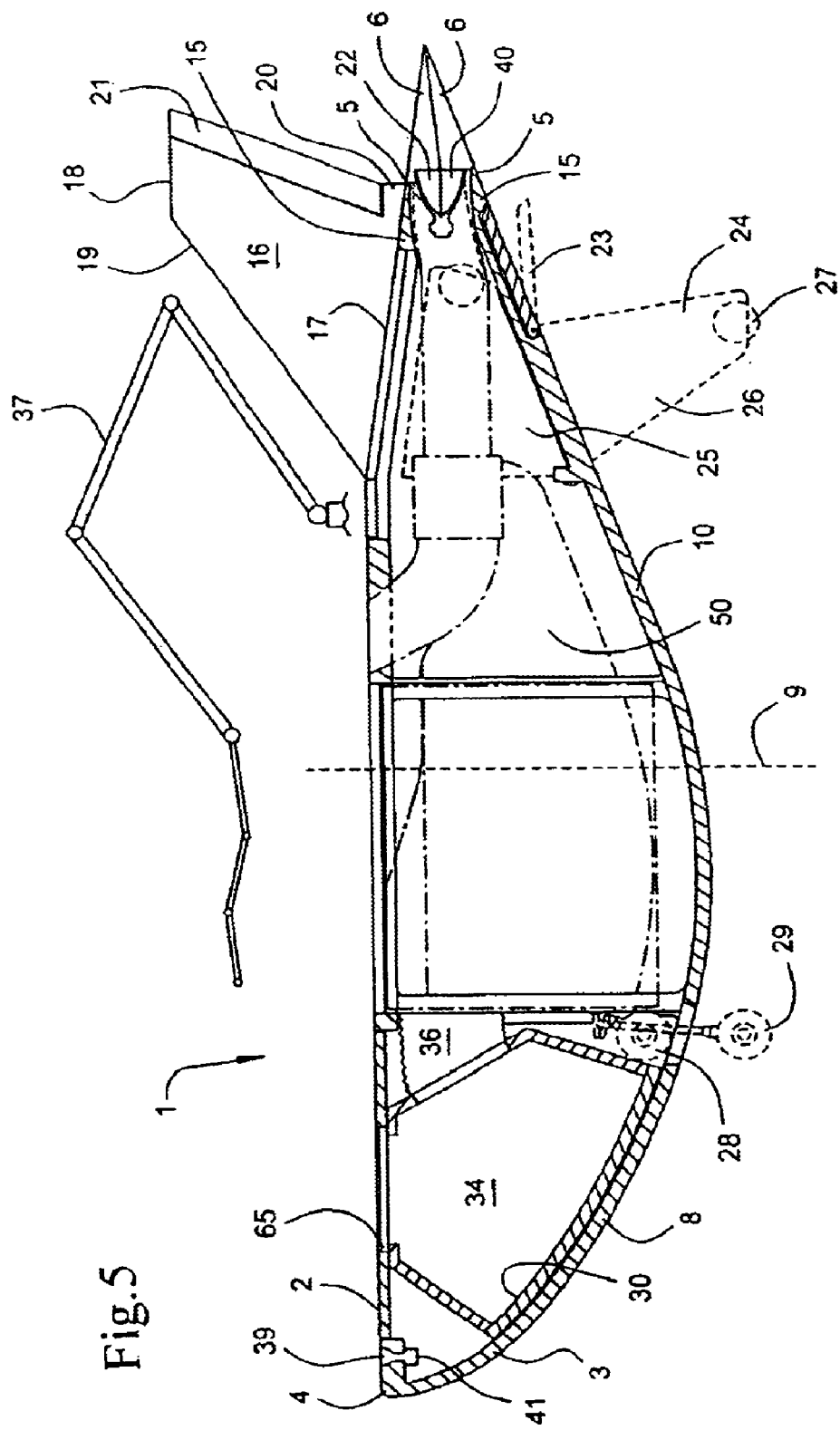
FIG. 5 is a side cutaway view of a preferred embodiment of the invention.
Figure 6:
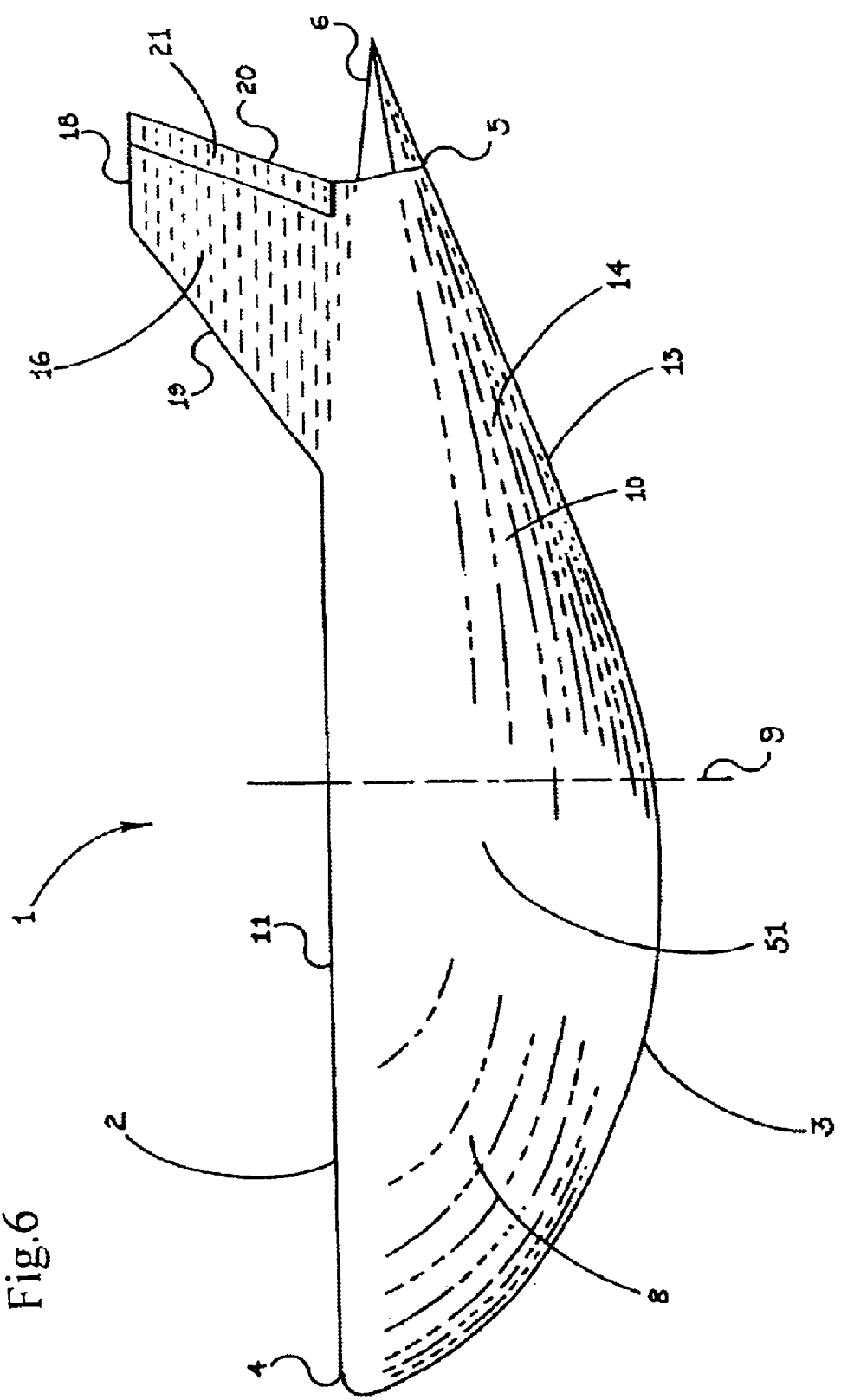
FIG. 6 is a side view of a preferred embodiment of the invention.
Figure 7:
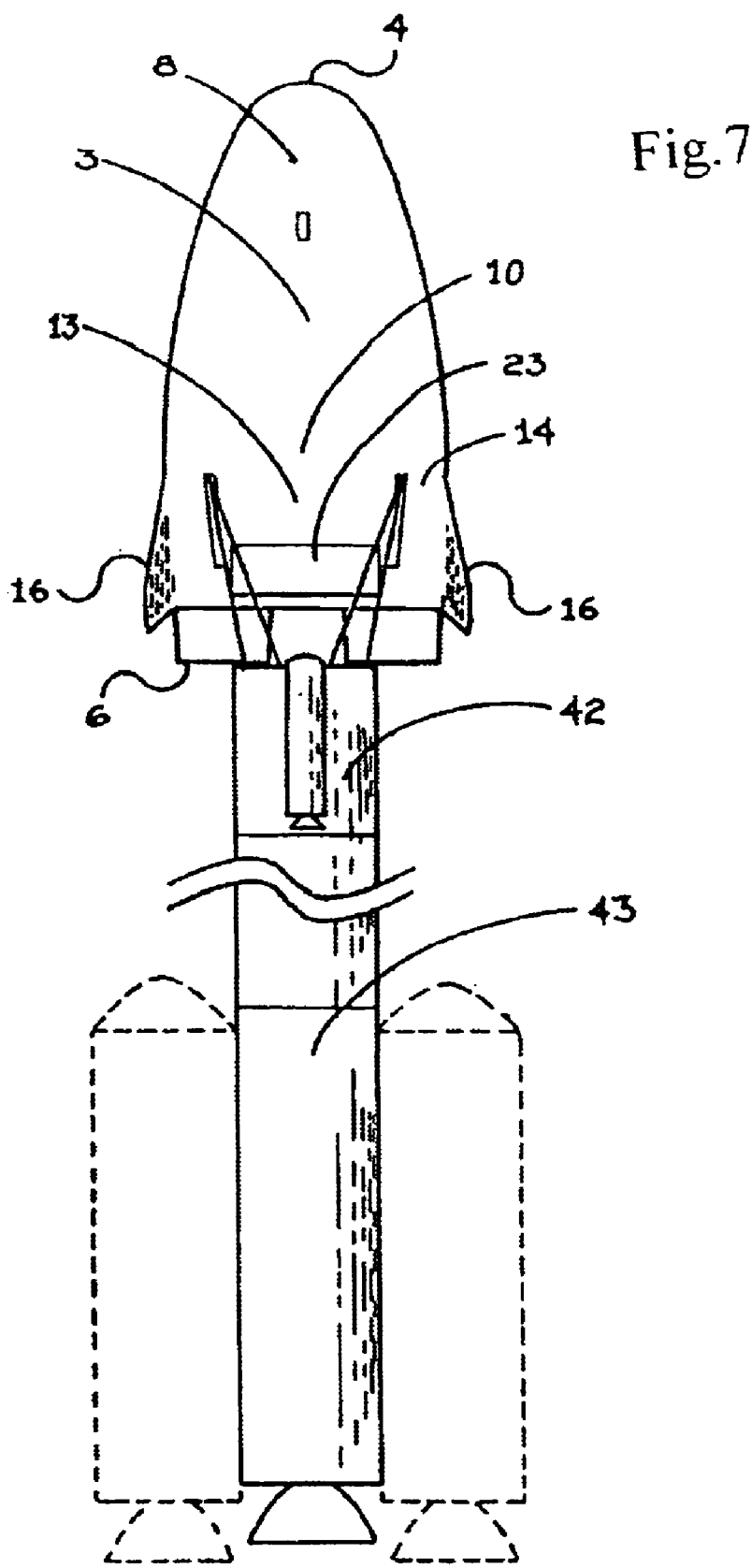
FIG. 7 is a bottom view of a preferred embodiment of the invention mounted to a launch vehicle.
Figure 9:
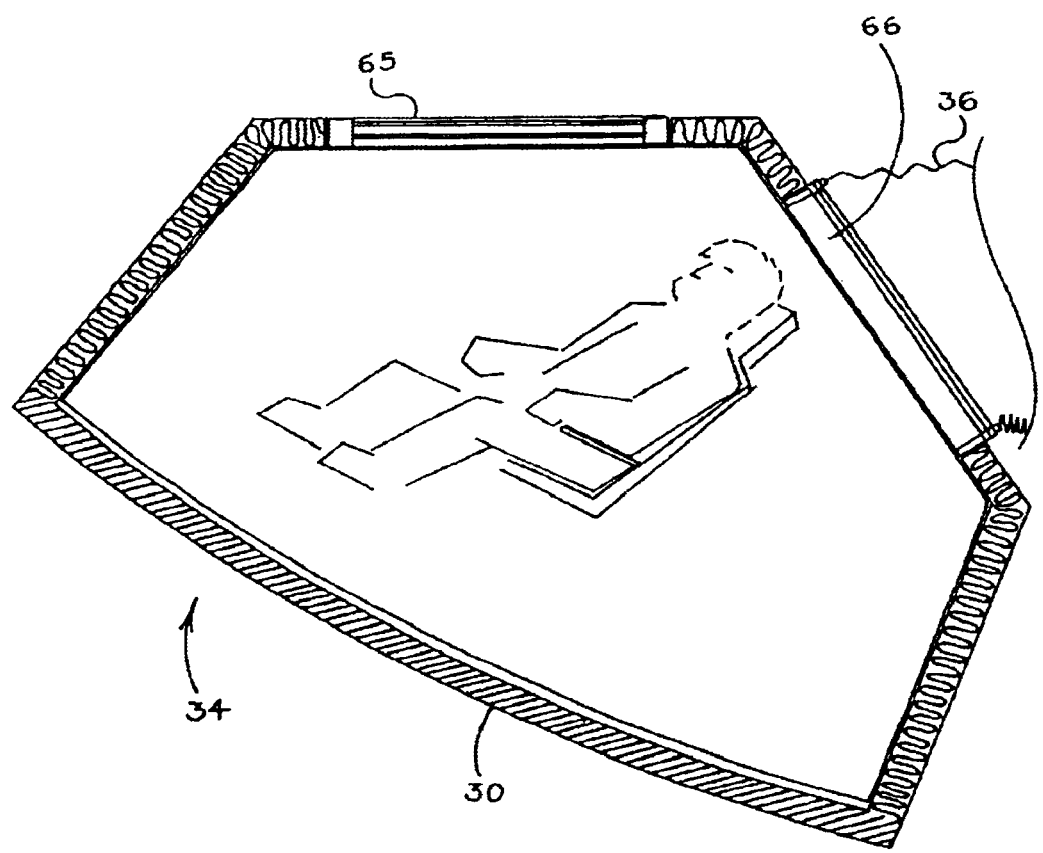
FIG. 9 is a side cutaway view of a preferred embodiment of a control module containing a pilot.

The invention comprises a lifting body aircraft 1 having an upper surface 2 and a lower surface 3. Upper surface 2 extends from the nose 4 to the tail 5 of craft 1. The length of craft 1 is that dimension extending from nose 4 to tail 5, excluding any elevons 6 (discussed below) which may be provided at the tail end or aft end 7 of craft 1.

Lower surface 3 has a first half 8 extending from nose 4 to about the longitudinal center line 9 of craft 1. The longitudinal center line 9 of craft 1 is determined by a plane severing craft 1 perpendicular to the length of craft 1 at the half way point between nose 4 and tail 5. Lower surface 3 also has a second half 10 extending from about longitudinal center line 9 to tail 5.

Upper surface 2 has a pair of edges 11 that extend from nose 4 to tail 5 such that nose 4, edges 11, and tail 5 demark upper surface 2. Edges 11 also demark two boundaries between upper surface 2 and lower surface 3. Edges 11 preferably run from nose 4 to tail 5 in a smooth continuous curve, widening continuously from nose 4 to a pair of points 12 each about one fourth of the way from tail 5 (or three fourths of the way from nose 4). The width of craft 1 is the longest dimension across upper surface 2 perpendicular to the length of craft 1. In one preferred embodiment the width is that distance between points 12. In another preferred embodiment, edges 12 continue on to tail 5 after points 12 at a distance from one another equal to that at points 12. In another preferred embodiment, edges 11 narrow or taper slightly between points 12 and tail 5. In still another embodiment, edges 11 continue to diverge until reaching tail 5 such that the width of craft 1 would be determined by measuring upper surface 2 across tail 5.

First half 8 of lower surface 3 is preferably doubly convex, meaning that it is convex in he dimension between nose 4 and longitudinal center line 9 as well as between edges 11. This will provide craft 1 with an enlarged front end, which will maximize the displacement of air over lower surface 3, thereby increasing pressure below craft 1.

Second half 10 of lower surface 3 has a central section 13 and side sections 14. Central section 13 extends from about longitudinal center line 9 to tail 5. The width of central section 13 is preferably about eighty-five percent of the width of craft 1. Central section 13 is preferably substantially flat rather than curved and should preferably extend toward tail 5 at an angle of about nineteen degrees with respect to a horizontal dimension substantially parallel to upper surface 2.

Side sections 14 begin as approximately flat surfaces depending from edges 11 in a direction generally normal to upper surface 2. At a point approximately one half the present depth of craft 1 at that longitudinal location, side sections 14 extend into a smooth convex curve to meet the outboard edges of central section 13.

Upper surface 2 is preferably as flat as practical from nose 4 to tail 5, preferably with a curvature of about three to five degrees or less. In one preferred embodiment, upper surface 2 begins to taper slightly, preferably at an angle of about 7.5 degrees to the horizontal, toward lower surface 3 at a point about one fourth of the length of craft 1 before tail 5 (or three fourths of the length of craft 1 after nose 4).

By configuring craft 1 with a doubly convex lower surface 3 fore of the longitudinal center line 9 and a flat tapering lower surface 3 aft of the longitudinal center line 9 and a flat or substantially flat upper surface 2, the internal volume of craft 1 will be greater forward of the longitudinal center line 9 than aft. Although the location of the center of gravity of craft 1 will depend upon how craft 1 is loaded, by configuring the internal volume of craft 1 as described, it will be possible to position the center of gravity of craft 1 forward of the longitudinal center line 9. Preferably, the center of gravity is located within about five percent of the length of craft 1 from the longitudinal center line 9 and most preferably at about five percent of the length of craft 1 from the longitudinal center line.

Providing a center of gravity for craft 1 that is forward of the longitudinal center line 9 will enhance its flight stability. In combination with the wider remainder of craft 1, it will function like a shuttlecock, with the center of gravity forward and with a less massive but wider portion behind. Lifting body craft have a natural tendency to pitch up from the mass of air being pushed by the nose of the craft. This pitch up effect is reduced and the craft will naturally travel with its longer (as measured from the center of gravity) lighter tail following the heavier nose. However, care must be taken to ensure that the center of gravity is not too far forward. If the center of gravity is too far forward, craft 1 may begin to behave more like a thrown hammer than a shuttlecock, with tail 5 naturally tending to rotate around nose 4.

Positioning the center of gravity fore of longitudinal center line 9 by about five percent of the length of craft 1 is believed to be the most efficacious position in the preferred embodiment; however further or lesser advancement of the center of gravity fore of the longitudinal center line 9 may prove efficacious as the dimensions or overall mass of craft 1 are varied. The most ideal position for the center of gravity for any craft 1 built according to the teachings of this invention should, therefore, preferably be determined experimentally across the entire flight velocity and attitude regime designed for the application, most preferably by building a scale model and conducting computer analysis and wind tunnel testing.

Extending from tail 5 are one or preferably at least two elevons 6. Elevons 6 will serve at least two purposes. First, as noted above, upper surface 2 and lower surface 3 are configured to taper smoothly to a point, thereby creating the aft portion of an airfoil 15. As craft 1 moves through the air, it displaces air. As the air masses separated by craft 1 come back together, turbulence is created, with several adverse effects. As air spills from below craft 1, it will generate turbulence above craft 1, thereby reducing lift. Second, turbulence around the control surfaces of craft 1 will make craft 1 more difficult to control. Finally, turbulence will create a contrail behind craft 1, making it more visible, which may confound the purposes of the pilot if stealth is desired. The aft portion of airfoil 15 brings the air flowing over upper surface 2 and lower surface 3 back into substantially parallel and adjacent paths, restoring substantially laminar flow and reducing turbulence and drag. Elevons 6 serve to effectively extend the aft portion of airfoil 15 beyond tail 5 of craft 1.

Elevons 6 also provide pitch control for craft 1. By raising elevons 6, nose 4 may be raised and by lowering elevons 6, nose 4 may be lowered. Elevons 6 also provide roll control for craft 1. By raising only one starboard elevon 6, for example, craft 1 will roll clockwise, as viewed from the pilot's position looking forward.

In one preferred embodiment, elevons 6 may be split into upper and lower sections. These sections may be operated together or they may he deployed in opposite directions (up and down). When deployed in opposite directions, the sections of elevons 6 will serve to brake the speed of craft 1 and also to provide greater surface area to its control surfaces. This latter feature may be particularly useful when craft 1 is used as a reentry vehicle.

In one preferred embodiment, a ventral body flap 23 is provided in central section 13 of lower surface 3, preferably proximate to tail 5. Ventral body flap 23 may be used to provide additional pitch control for craft 1, primarily when craft 1 is in relatively high pitch attitudes (above about thirty degrees).

As mentioned above, one of the ways turbulence can arise in the operation of craft 1 is from the collision of air masses flowing over upper surface 2 and lower surface 3 when those masses meet. Air masses may collide at edges 11 as well as tail 5. The resulting turbulence may be particularly disruptive to the flight stability of craft 1. To counter this potential turbulence, a pair of dorsal vertical stabilizers 16 are provided. Dorsal vertical stabilizers 16 have a base 17 and an upper end 18 opposite base 17, a leading edge 19, and a trailing edge 20. In the preferred embodiment, bases 17 of each stabilizer 16 are positioned along edge 11 beginning at tail 5 and extending toward nose 4 a distance equal to about twenty-five percent of the length of craft 1. Dorsal vertical stabilizers 16 are preferably angled outward from base 17 to upper end 18 at about twenty degrees with respect to vertical. In the preferred embodiment, upper end 18 is about one third the length of base 17. Leading edge 19 is preferably angled at about sixty to seventy degrees and most preferably at about sixty-eight degrees to the horizontal and trailing edge is preferably angled at about sixty-five to seventy-five degrees and most preferably at about seventy degrees to the horizontal. In the preferred embodiment, dorsal vertical stabilizers 16 preferably extend about 4.2 feet above upper surface 2 of craft 1.

Dorsal vertical stabilizers 16 will serve as winglets, meaning that they will prevent the air flow passing over lower surface 3 from developing eddies and cavitation effects at the aft end of craft 1. Air moving over lower surface 3 and upper surface 2 will be separated by dorsal vertical stabilizers 16, at least in the vicinity of tail 5. This will reduce turbulence and conversely increase lift.

Dorsal vertical stabilizers 16 will also serve to provide craft 1 with additional yaw stability. Dorsal vertical stabilizers 16 provide a substantial surface area aft of the center of gravity. For craft 1 to yaw or pivot about a vertical axis through its center of gravity, dorsal vertical stabilizers 16 will have to move against the air flow. The resistance to this movement helps keep the aft end of craft 1 in line behind its center of gravity in much the same way as the vanes of a shuttlecock keep it in line in flight.

Dorsal vertical stabilizers 16 will also help prevent craft 1 from spinning about its horizontal lengthwise axis, like vanes on a dart. To do so, the wide flat surfaces of dorsal vertical stabilizer 16 would have to move against the air flow. The resistance to this movement helps to keep craft 1 stable in a roll.

Trailing edges 20 of dorsal vertical stabilizers 16 may also be provided with rudders 21. Rudders 21 will provide a roll impetus and yaw impetus to craft 1. Although both impetuses are provided, the only appreciable effect on craft 1 will be to roll.

The yaw impetus is relatively apparent. As rudder 21 is moved to one side, air will impact extended rudder 21, applying force to craft 1 at an angle roughly perpendicular to dorsal vertical stabilizers 16, thereby generating a yaw impetus. However, as soon as this begins, the airflow over craft 1 will strongly resist the yaw impetus. Any yaw of craft 1 will present a leading side of craft 1 and of dorsal vertical stabilizers 16 to the airflow. The airflow against the leading side will generate pressure against this leading side. Similarly, a trailing side of craft 1 and of dorsal vertical stabilizers 16 will also be created. The trailing side will be protected from the airflow, and a decrease in pressure will result. The increase in pressure on the leading side of craft 1 and dorsal vertical stabilizers 16 combined with the reduction in pressure on the trailing side will result in craft 1 returning to a flight having zero degrees of yaw. Any deviation from a zero degree yaw attitude will cause an immediate and proportional force resisting the yaw impetus to be exerted on craft 1.

When rudders 21 are deflected to one side, they also generate a roll impetus. Airflow over dorsal vertical stabilizers 16 is more laminar and, therefore, more concentrated at the upper ends 18 of stabilizers 16. Because the airflow is more concentrated at the upper ends 18 of vertical stabilizers 16, the force applied to rudders 21 by the airflow when rudders 21 are deflected is greater near upper ends 18 than near base 17. When the forces applied across the length of a deflected rudder 21 are resolved into a vector, the vector will, therefore, be located near upper end 18. This force vector will act over an effective lever arm extending from the location of the resolved force vector to the center of gravity of craft 1. As described above, this force vector will be roughly perpendicular to vertical stabilizers 16. Thus, the force acting across the effective lever arm will generate a roll moment causing craft 1 to roll.

Unlike the yaw impetus, the roll impetus is not resisted by proportional restoring forces, although there is a righting moment that arises in a roll, discussed below. In a conventional winged aircraft, the roll moment is opposed by large lift forces effectively located at the center of lift of the wings. These lift forces act across long moment arm distances extending from the center of lift of each wing to the center of gravity of the craft. To cause winged craft to roll, these forces must be overcome. No such forces exist in lift bodies. Accordingly, craft 1 can be caused to roll with the roll impetus from rudders 21.

In view of the high resistance of craft 1 to yawing and the relative lack of resistance of craft 1 to rolling, when rudders 21 are deflected, craft 1 will roll rather than yaw. This results in turns that are banked angles rather than flat turns, providing an aircraft that is highly maneuverable and responsive.

When dorsal vertical stabilizers are angled outward, rudders 21 may also be used to control pitch. Moving the starboard rudder to port and the port rudder to starboard will cause nose 4 to pitch up. Moving the starboard rubber to starboard and the port rudder to port will also cause nose 4 to pitch down.

The effect of rudders 21 on pitch arc the result of V-tail mixing. Because dorsal vertical stabilizers 16 are positioned at an angle, rudders 21 function both as rudders and elevators. If vertical stabilizers 16 were positioned at a forty-five degree angle, displacement of rudders 21 would provide equal roll impetus (rudder function) and pitch impetus (elevator function). In the most preferred embodiment, dorsal vertical stabilizers 16 are angled outward about twenty degrees from the vertical. Thus, rudders 21 provide more impetus to roll and less to pitch. Nevertheless, if both rudders 21 are moved inboard (starboard rudder to port and port rudder to starboard) or if both rudders 21 are moved outboard (starboard rudder to starboard and port rudder to port) the roll impetus from each rudder 21 will neutralize the other. Only the pitch impetus will have net effect on the attitude of craft 1. This configuration provides redundancy in the controls of craft 1. Pitch, roll, and yaw impetus may be provided by both rudders 21 and elevons 6.

In a preferred embodiment, rudders 21 are each divided into a left and right section, allowing each rudder 21 to be opened simultaneously in both directions. When craft 1 is used as a reentry vehicle, this feature is expected to be particularly useful. During the initial stages of reentry, craft 1 will travel through the very thin portions of the upper atmosphere. There will be little air to act on craft 1. The ability of the control surfaces of craft 1 to "bite" the thin air and keep craft 1 properly oriented may be increased by increasing the surface area of those control surface. Flaring each section of rudders 21 will maximize their surface area. When craft 1 is in lower levels of the atmosphere, extending the sections of rudders 21 in opposite directions can serve to brake the speed of craft 1.

In one preferred embodiment, dorsal vertical stabilizers 16 may be hinged to lie flat against upper surface 2. The inventors contemplate folding stabilizers 16 down during launch and deploying stabilizers 16 prior to reentry.

In addition to the features mentioned above, several other features help keep craft 1 stable in flight. Any potential rotation of craft 1 about a horizontal axis perpendicular to its length (i.e., pitch) is resisted by the outward flare of dorsal vertical stabilizers 16 and by the relative width of tail 5 compared to nose 4. The outward flare of dorsal vertical stabilizers 16 would require the surfaces of stabilizers 16 to move against the airflow were craft 1 to rotate in this manner. Similarly, the wide areas of the aft portion of upper surface 2 or the aft portion of lower surface 3 would have to move against the air flow for craft 1 to rotate in this manner.

Craft 1 also has a natural righting moment in a roll. The force exerted on craft 1 by lift may be represented by a vector (L) which is generally perpendicular to upper surface 2 of craft 1 and positioned at the approximate center of upper surface 2 and preferably aligned over the center of gravity of craft 1 in the Y axis (port-starboard dimension). The force of gravity acting on the mass of craft 1 may be represented by a vector (W) depending straight down from the center of gravity of craft 1. When craft 1 begins to roll, the vector representing lift (L) will still be generally perpendicular to upper surface 2 of craft 1, as shown in FIG. 8B. Significantly, however, although lift (L) is still positioned at the approximate center of upper surface 2, it is no longer positioned over the center of gravity of craft 1. The lift vector (L) may be resolved into its horizontal (Lx) and vertical (Ly) components. The vertical (Ly) component and weight (W) still oppose one another. However, they now do so across a distance equal to the horizontal displacement between Ly and W. These opposing forces acting across this distance will create a negative roll moment which will urge craft 1 to return to a horizontally neutral attitude. Thus craft 1 will naturally recover from a roll.

Craft 1 will also naturally recover from a stall. As craft 1 increases its angle of attack, lift will increase at first; however, as the angle of attack exceeds about forty degrees to horizontal, lift will begin to diminish and when the angle of attack of craft 1 exceeds about forty-five degrees to the horizontal, depending upon air speed, laminar air flow over the upper surface is completely disrupted and replaced by turbulent flow, resulting in the complete loss of lift. At this point, craft 1 will stall.

Aerodynamic control of most aircraft is lost in a stall because one airfoil surface stalls first, losing all lift and causing the craft to roll and spin. Control surfaces become ineffective, and significant pilot input is usually required for any chance of recovery. However, because the center of gravity of craft 1 is forward, craft 1 will pivot around a horizontal axis perpendicular to its length in a stall and fall with nose 4 forward. Dropping nose 4 will reestablish and/or reorient airflow over craft 1 and resume effective lift with or without pilot intervention. Thus, the natural inclination of craft 1 will be to provide proper corrective action in a stall. The inherent stability of craft 1 will be particularly important in unmanned and unmanned combat versions of craft 1 where control input response to extreme flight dynamics is often limited.

The depth of craft 1 is that distance defined by the longest line that can be extended from lower surface 3 to upper surface 2 and which is perpendicular to upper surface 2. The preferred embodiment of craft 1 has a length to width to depth ratio of about 4:4:2 to about 4:1:1 and most preferably about 4:2:1. This ratio will facilitate the forward center of gravity discussed above. The preferred embodiment of craft 1 will have a length of about thirty feet, width of about fifteen feet, and depth of about seven and a half feet, although larger or smaller craft may certainly be constructed, preferably following the above recited ratios.

Craft 1 may also be provided with ventral vertical stabilizers 24. Ventral vertical stabilizers 24 will depend from lower surface 3 of craft 1, proximate tail 5. Ventral stabilizers 24 will perform the same functions as dorsal vertical stabilizers 16. However, in the preferred embodiment, Ventral vertical stabilizers 24 will be contained within craft 1 in a retracted position 25 and may be extended out through lower surface 3 to a deployed position 26 when needed. Rear landing gear 27 may be combined with or used independently of ventral vertical stabilizers 24. Forward landing gear 28 is also preferably provided. Forward landing gear 28 should also have a retracted position within craft 1 and a deployed position 29 wherein it will depend from lower surface 3. Landing gear 27 and 28 may be wheels, skids, or any other conventional landing gear mechanism.

Landing gear 27 and 28 are not necessary for the landing of craft 1. Craft 1 is ideally suited to water landings. Lower surface 3 has a shape resembling the hull of a boat. Craft 1 should be airtight, and should float or should be easily made to float. Thus, craft 1 may take off or land in the same fashion as a standard sea plane. When craft 1 is used as a reentry vehicle, sea plane style water landings may be preferable as they will avoid the need to include openings in lower surface 3. This may be desirable since any opening represents a potential failure point during the extreme stresses of reentry.

When lifting craft 1 is used for atmospheric flight, it may be used a glider; however, it will preferably be provided with a thrust source 22 such as an air breathing jet engine, a propeller engine, or other conventional thrust sources. When thrust source 22 is a jet engine, thrust source 22 is preferably centrally located within craft 1 with its exhaust end centrally located at tail 5. A propulsion module bay 32 with a propulsion module bay door 33 in upper surface 2 is preferably provided to allow access to thrust source 22 and propulsion module bay 32.

Thrust source 22 is preferably mounted within an interchangeable propulsion module. Propulsion module will preferably be provided with standardized interchange connections to allow one propulsion module to be easily removed and replaced with another.

When thrust source 22 is an air breathing engine, air intake passage(s) preferably lead from the engine to one or more air intake apertures 60 preferably located in upper surface 2. One or more fuel tanks 50 are also preferably provided within craft 1 for thrust source 22. In one preferred embodiment, fuel tanks 50 will be located on each side of craft 2 generally parallel to edges 11, but running along and conforming to the inner surface of lower surface 3. A power take off or PTO shaft will preferably be provided from thrust source 22 to provide mechanical power to other items in craft 1 such as modules 30, discussed below. PTO is expected to be particularly useful for military applications such as atmospheric weapons.

Although thrust source 22 may certainly be used when craft 1 is used as a reentry vehicle, operators may find it useful to omit thrust source 22 and fuel tank 50 and to operate craft 1 as a glider in some circumstances. Room and weight are at a premium on any flight into space. Eliminating fuel tank 50 and thrust source 22 will allow the space they would have occupied to be used for other mission objectives.

In the preferred embodiment, craft 1 is provided with one or more internal inter-changeable modules 30. Modules 30 may include supply modules, crew ferry modules, laboratory modules, habitation modules (pressurable modules), propulsion modules, orbital maneuvering modules, medical evacuation module, fuel modules, control modules, payload modules, rescue and escape modules, tanker modules, weapons modules (for atmospheric or orbital applications). Modules 30 may be used to ferry crew and cargo between craft 1 and other craft such as the international space station and the like. Modules 30 are preferably rendered interchangeable by providing each with a standardized frame and standardized fittings and adaptors. Modules 30 may be of any size or configuration that can be mounted within the interior of a particular craft 1. Preferably, the fittings and adaptors should be standardized so that modules 30 may be moved from one craft 1 to another. By fitting the interior of craft 1 to receive modules 30, the function of craft 1 may be varied easily without requiring significant reconstructive efforts.

In the preferred embodiment, craft 1 is provided with an openable cargo bay door 31 in upper surface 2. Cargo bay door 31 should be sized to allow modules 30 to pass through when cargo bay door 31 is open. In the preferred embodiment, cargo modules are contemplated to be about 8ft.×8ft.×6ft.; however, this may change depending upon the size of craft 1 utilized. Dimensions may also vary depending upon the purposes to which other modules 30 are put.

Craft 1 is preferably provided with rail systems on which modules 30 may be mounted and deployed within craft 1. This will allow modules 30 to be positioned within craft 1 through cargo bay door 31 or any access hatches and readily deployed or inserted during orbit.

One of modules 30 will preferably be a control module 34. Although craft 1 may be an unmanned craft, when it is piloted, it is contemplated that the pilot and crew will be positioned in a control module 34 positioned proximate to nose 4 of craft 1. Like all modules 30, control modules 34 are provided with standardized frames, adaptors, and connectors, to facilitate their interchangeability. In the preferred embodiment, control modules 34 are readily installed, deployed, or exchanged, whether in the field or on orbit, through access hatch 81. Control modules 34 may include manned crew cockpit modules for space mission operations, military cockpit modules for space or atmospheric operations, unmanned aerial vehicle or unmanned combat aerial vehicle control modules, and unmanned science modules.

The instruments and controls needed to pilot craft 1 as well as communication and other equipment desirable for the operation of craft 1 should be located in control module 34 and interfaced with the other (preferably modular) systems of craft 1.

Control module 34 should preferably be provided with a transparent window to allow the pilot to see to fly and land craft 1. The transparent window in control module 34 may align with a transparent section in lower surface 3, nose 4, and/or upper surface 2. Alternatively, control module 34 may be configured to be mechanically raised and lowered to locate the transparent window above upper surface 2 and to enhance pilot visibility. Craft 1 will preferably be provided with a control module hatch 81 in upper surface 2 which is sized to allow control module 34 to be added and removed.

Control modules 34 may also offer safety options for craft 1 and its crew. Control module 34 may be configured to be ejected from craft 1, preferably with explosives. If problems develop with craft 1 during launch, orbit, reentry or flight which appear likely to result in the failure of craft 1, the crew may escape by ejecting control module 34. Control module 34 preferably will be provided with cone drogue stabilization, one or more parachutes and a heat resistant outer surface comprised of a spherical section ablative heat shield, not unlike the Gemini or Apollo capsules. These features will increase the chances of control module 34 and its crew surviving a ballistic reentry.

Control module 34 may also be included within another module 30, and carried within the cargo area of craft 1. In this embodiment, the control module 34 positioned within module 30 should preferably be positioned to allow its primary hatch 65 to mate with secondary hatch 66 (described below) of the control module 34 located proximate to nose 4 of craft 1, preferably via transfer tunnels 36 (described below). Control module 34 should also preferably be positioned to align secondary hatch 66 with upper surface 2 of craft 1, whereby hatch 66 may be accessible when cargo bay doors 31 are open. In this configuration, control module 34 may be used for crew rescue or crew transfer missions while still providing the same emergency abort and safety options as when control module 34 is positioned proximate to nose 4.

Another potential use of modules 30 would be as an emergency medical evacuation and emergency crew rescue module 35. Evacuation module 35 is a pressurized crew habitation module containing life support capabilities. Evacuation module 35 should be airtight and pressurized and should contain oxygen and preferably water, food, and medical supplies.

Modules 30 should preferably be provided with sealable transfer tunnels 36 connecting modules 30 to each other. Tunnels 36 will allow crew members to access the different modules 30 as needed. However, tunnels 36 should be sealable so that crew members can separate one module 30 from another. Sealing may be accomplished with hatches or other conventional closures for providing airtight seals between compartments. Manned modules should preferably be provided with docking hatch 38a, discussed below, and secondary hatch 66 which provides access to the intermodular transfer tunnels 36.

In the event of a medical emergency aboard the International Space Station or other orbital vehicle or facility, evacuation module 35 could be sent up in craft 1, together with medical staff. Craft 1 would rendezvous and preferably dock with the orbital craft or facility containing the endangered crew using docking hatch 38a.

The medical rescue crew would either already be in the evacuation module or would transfer to it from other portions of craft 1 via transfer tunnel 36. If necessary, the rescue crew would enter the other craft to retrieve the endangered crew. The rescue crew could attend to the evacuated crew in the evacuation module during the return to Earth. The reentry and flight flexibility of craft 1 will enable return directly to appropriate medical facilities on Earth.

Craft 1 may be provided with a module 30 containing an articulable robotic arm 37 for use in space. In a preferred embodiment, module 30 containing robotic arm 37 may be mounted in propulsion module bay 32. When propulsion module bay door 33 is opened, robotic arm 37 may be deployed. The distal end of robotic arm 37 may be provided with a clamp or other operational tools. Robotic arm 37 could be used to move modules 30 or other payload out of or into craft 1 or out of or into other vehicles or space facilities. Robotic arm 37 could be used to capture or launch satellites or other orbital objects. Robotic arm 37 may also be provided with one or more cameras that would allow the crew of craft 1 to visually inspect the interior or exterior of craft 1 while craft 1 was in orbit.

Particularly when craft 1 is intended for space flight and most particularly when it is intended to dock with the international space station or other space vehicles, craft 1 may be provided with a docking hatch 38 configured to engage the space station via one of the station's pressurized docking adaptors. In one embodiment of craft 1, docking hatch 38 is preferably provided in upper surface 2 proximate to nose 1 and directly over control module 34 and interfaced with primary hatch 65 providing access to control module 34. An alternate or additional docking hatch 38a may be incorporated in the upper surface of a module 30. When module 30 is positioned within craft 1 below cargo bay door 31, cargo bay door 31 may be opened to provide access to docking hatch 38a. When module 30 is used a crew transfer module, crew members may enter and exit craft 1 through docking hatch 38a without having to pass through the remainder of craft 1. Similarly, when module 30 is used to transfer cargo or supplies, they may be loaded or offloaded directly into module 30 without passing through the remainder of craft 1.

When craft 1 is intended for space flight and/or reentry, it will preferably be provided with one or more orbital thrust sources 39. These will typically include a rocket engine 40 located in the stern of craft 1 proximate to tail 5. Rocket engine 40 will preferably be contained within an interchangeable module 30, like the rest of the hardware in craft 1. Rocket engine 40 will preferably be provided with a gimbaled mounting allowing the thrust of the engine to be swiveled on two different axes.

Orbital thrust sources 39 may also include a reaction control system 41 such as a pressurized gas jet or miniature bi-propellant rocket positioned at other locations on craft 1, such as nose 4. Reaction control system 41 will also preferably be contained in interchangeable modules 30. By activating reaction control systems 41, rocket engine 40 or other orbital thrust sources 39 with which craft 1 may be provided, craft 1 may be maneuvered in space for orbital adjustments, engaging satellites, the international space station, or other craft on orbit or for de-orbit.

Orbital thrust sources 39 may also be used to stabilize craft 1 during reentry. As noted above, during the initial stages of reentry, the atmosphere is relatively thin, making it difficult for the control surfaces of craft 1 to effectively steer craft 1. Orbital thrust sources 39 may be activated as necessary to keep craft 1 oriented properly. Preferably, the activation of orbital thrust sources 39 will be computer controlled during reentry.

When craft 1 is used for space flight, it will be launched into orbit. It is anticipated that conventional rockets 43 such as the multi-stage solid rocket boosters currently used for satellite or space shuttle launches would be used to launch craft 1, although other rocket designs, such as liquid rockets or single stage rockets, could be used if desired. The inventors currently contemplate using a Peace Keeper based rocket, namely the Eagle S2 and PASS Unit produced by E'Prime Aerospace Corp. of Titusville, Fla.

Once rockets 43 are expended, they will be jettisoned. Payload assistance or PASS liquid fueled rockets 42 will preferably remain after launch rockets 43 have been jettisoned. PASS rockets 42 may be used to bring craft 1 into a higher or lower orbit or to de-orbit. PASS rockets 42 may be used in place of or in conjunction with orbital thrust sources 39. However, once craft 1 has been properly positioned for de-orbit, PASS rockets 42 or other strap on rockets will preferably be jettisoned. PASS rockets 42 and other strap on rockets can be used either for retrograde (opposite the direction of travel) or posigrade (in the direction of travel) applications.

PASS rockets 42 or other strap on solid rockets may also be used to abort a launch. If problems develop while craft 1 is being launched or while solid rockets 43 are still on the launch pad, PASS rockets 42 may be fired to effect separation between craft 1 and rockets 43. Once separation is achieved, PASS rockets 42 may be jettisoned and craft 1 landed in the conventional manner.

The design of craft 1 is particularly well suited for reentry. Lower surface 3 presents a wide blunt surface to the atmosphere upon reentry. Such a surface will result in craft 1 slowing relatively quickly. It will also cause a large plasma shock wave to build up in front of descending craft 1 as it passes through the upper portions of the atmosphere. This shock wave will shield craft 1 from much of the heat of reentry.

Craft 1 will preferably be made by winding a gelatinous fabric comprising silicon nitride, carbon fibers and a high temperature thermal setting resin or other equivalent materials about a preformed mandrel, similar to the way that composite rocket booster casings are manufactured. In one preferred embodiment, the mandrel assembly will include ribs; stiffeners; honeycomb panels; hardpoint subassemblies; and mounting adapters for hatches, fins, landing gear and modules 30. When the winding is complete and the fabric layers are cured, the entire airframe or aeroshell will become a single unit contained within a strong, rigid, and continuous outer shell that should be suitable for the stresses of flight and reentry. Thus, in one preferred embodiment of craft 1, the outer surface of lower surface 3 may present a single unbroken aeroshell 51 for craft 1. Hatches and penetrations of aeroshell 51 are preferably confined to upper surface 2, where they are not subject to maximum reentry thermal and pressure loads. Any penetrations of lower surface 3 are preferably kept small and should preferably be isolated from the remainder of the interior of craft 1 with sealed bays.

The absence of any breaks in lower surface 3 will decrease the number of potential failure points in aeroshell 51. Also, the doubly convex shape of the leading portion of aeroshell 51 is well suited for distributing the force of any blows aeroshell 51 may receive during flight. This is particularly important because of the ever increasing amount of "space junk" orbiting the planet. The extreme velocity of all orbiting bodies makes the risk of collision with such items a real and growing danger, which should preferably be taken into account in designing orbital vehicles.

Other uses and embodiments of the invention, equivalent to those disclosed herein, will occur to those skilled in the art, and are intended to be included within the scope and spirit of the following claims.

We claim:

1. A lifting body aircraft having a length, a width, a depth, and a longitudinal center line, said aircraft comprising:
    a substantially flat upper surface having a nose end and a tail end and edges extending therebetween;
    a lower surface having a first section and a second section, said first section extending from said nose end and said edges of said upper surface to about said longitudinal center line of said aircraft, said first section being convex between said nose end and said longitudinal center line and between said edges of said upper surface, said second section extending from said tail end of said upper surface to about said longitudinal center line of said aircraft, said second section having a substantially flat central section, whereby said second section of said lower surface and said tail end of said upper surface form a drag reducing airfoil; and
    a plurality of vertical stabilizers extending from said craft proximate to said tail end, wherein at least one of said vertical stabilizers extends from said lower surface.

2. A lifting body aircraft according to claim 1 having a center of gravity forward of said longitudinal center line.

3. A lifting body aircraft according to claim 2 wherein said center of gravity is forward of said longitudinal center line by a distance of about five percent of said length of said aircraft.

4. A lifting body aircraft according to claim 1 wherein the ratio of said length to said width is about 4:2.

5. A lifting body aircraft according to claim 1 wherein the ratio of said length to said depth is about 4:1.

6. A lifting body aircraft according to claim 1 wherein the ratio of said length to said width and to said depth is about 4:2:1.

7. A lifting body aircraft according to claim 1 wherein at least one of said vertical stabilizers is proximate to each of said edges of said upper surface.

8. A lifting body aircraft according to claim 1 wherein two of said vertical stabilizers extend from said upper surface.

9. A lifting body aircraft according to claim 8 wherein each of said two vertical stabilizers are proximate to one of said edges of said upper surface.

10. A lifting body aircraft according to claim 8 wherein each of said two vertical stabilizers extend from said upper surface at opposite angles, wherein the angle of each of said two vertical stabilizers are opposite in direction with respect to the other.

11. A lifting body aircraft according to claim 1 wherein said at least two of said vertical stabilizers extend from said lower surface.

12. A lifting body aircraft according to claim 1 wherein said at least two of said vertical stabilizers have a retracted position wherein said at least two vertical stabilizers are contained within said aircraft and a deployed position in which said at least two vertical stabilizers extend from said lower surface.

13. A lifting body aircraft according to claim 12 wherein said at least two of said vertical stabilizers further comprise landing gear.

14. A lifting body aircraft according to claim 11 wherein said at least two of said vertical stabilizers further comprise landing gear.

15. A lifting body aircraft according to claim 1 further comprising an elevon at said tail end of said upper surface.

16. A lifting body aircraft according to claim 1 wherein said lower surface further comprises an elevon proximate to said tail end of said upper surface.

17. A lifting body aircraft according to claim 1 further comprising a plurality of elevons at said tail end of said upper surface.

18. A lifting body aircraft according to claim 1 wherein said lower surface further comprises a plurality of elevons proximate to said tail end of said upper surface.

19. A lifting body aircraft according to claim 1 further comprising a cargo bay door in said upper surface, said cargo bay door configured to provide access the interior of said aircraft when said cargo bay door is open.

20. A lifting body aircraft according to claim 19 further comprising at least one module within said aircraft, said module sized to be removed from said aircraft via said cargo bay door.

21. A lifting body aircraft according to claim 1 further comprising an ejectable control module sized to house at least one crew member and containing instruments and controls necessary to operate said aircraft, said control module configured to be ejected from said aircraft in the event of failure of said aircraft.

22. A lifting body aircraft according to claim 1 further comprising a thrust source configured to provide thrust to said aircraft.

23. A lifting body aircraft according to claim 22 wherein said thrust source is a jet engine.

24. A lifting body aircraft according to claim 22 wherein said thrust source is a rocket.

25. A lifting body aircraft according to claim 1 wherein said aircraft further comprises a robotic arm.

26. A lifting body aircraft according to claim 1 wherein said aircraft further comprises a ventral body flap configured to provide pitch control to said aircraft.

27. A lifting body aircraft according to claim 1 wherein said upper surface has an aft end, and wherein said aft end is angled toward said lower surface.

28. A lifting body aircraft having a length, a width, a depth, and a longitudinal center line, said aircraft comprising:
   a substantially flat upper surface having a nose end and a tail end and edges extending therebetween;
   a lower surface having a first section and a second section, said first section extending from said nose end and said edges of said upper surface to about said longitudinal center line of said aircraft, said first section being convex between said nose end and said longitudinal center line and between said edges of said upper surface, said first section of said lower surface containing substantially no flat portions between said edges, said second section extending from said tail end of said upper surface to about said longitudinal center line of said aircraft, said second section having a substantially flat central section, whereby said second section of said lower surface and said tail end of said upper surface form a drag reducing airfoil; and
   having a center of gravity forward of said longitudinal center line.

29. A lifting body aircraft according to claim 28 wherein said center of gravity is forward of said longitudinal center line by a distance of about five percent of said length of said aircraft.

30. A lifting body aircraft according to claim 28 wherein the ratio of said length to said width is about 4:2.

31. A lifting body aircraft according to claim 28 wherein the ratio of said length to said depth is about 4:1.

32. A lifting body aircraft according to claim 28 wherein the ratio of said length to said width and to said depth is about 4:2:1.

33. A lifting body aircraft according to claim 28 further comprising a plurality of vertical stabilizers extending from said craft proximate to said tail end, wherein said vertical stabilizers have a leading edge and a trailing edge and at least one of said vertical stabilizers has a rudder attached to said trailing edge.

34. A lifting body aircraft according to claim 33 wherein two of said vertical stabilizers extend from said upper surface.

35. A lifting body aircraft according to claim 34 wherein each of said two vertical stabilizers are proximate to one of said edges of said upper surface.

36. A lifting body aircraft according to claim 28 wherein each of said two vertical stabilizers extend from said upper surface at opposite angles, wherein the angle of each of said two vertical stabilizers are opposite in direction with respect to the other.

37. A lifting body aircraft according to claim 33 wherein at least one of said vertical stabilizers extends from said lower surface.

38. A lifting body aircraft according to claim 33 wherein at least two of said vertical stabilizers extend from said lower surface.

39. A lifting body aircraft according to claim 38 wherein said at least two of said vertical stabilizers have a retracted position wherein said at least two vertical stabilizers are contained within said aircraft and a deployed position in which said at least two vertical stabilizers extend from said lower surface.

40. A lifting body aircraft according to claim 39 wherein said at least two of said vertical stabilizers further comprise landing gear.

41. A lifting body aircraft according to claim 38 wherein said at least two of said vertical stabilizers further comprise landing gear.

42. A lifting body aircraft according to claim 28 further comprising an elevon at said tail end of said upper surface.

43. A lifting body aircraft according to claim 28 wherein said lower surface further comprises an elevon proximate to said tail end of said upper surface.

44. A lifting body aircraft according to claim 28 wherein said lower surface further comprises a plurality of elevons proximate to said tail end of said upper surface.

45. A lifting body aircraft according to claim 28 further comprising a cargo bay door in said upper surface, said cargo bay door configured to provide access the interior of said aircraft when said cargo bay door is open.

46. A lifting body aircraft according to claim 45 further comprising at least one module within said aircraft, said module sized to be removed from said aircraft via said cargo bay door.

47. A lifting body aircraft according to claim 28 further comprising an ejectable control module sized to house at least one crew member and containing instruments and controls necessary to operate said aircraft, said control module configured to be ejected from said aircraft in the event of failure of said aircraft.

48. A lifting body aircraft according to claim 28 further comprising a thrust source configured to provide thrust to said aircraft.

49. A lifting body aircraft according to claim 48 wherein said thrust source is a jet engine.

50. A lifting body aircraft according to claim 48 wherein said thrust source is a rocket.

51. A lifting body aircraft according to claim 28 wherein said aircraft further comprises a robotic arm.

52. A lifting body aircraft according to claim 28 wherein said aircraft further comprises a ventral body flap configured to provide pitch control to said aircraft.

53. A lifting body aircraft according to claim 28 wherein said upper surface has an aft end, and wherein said aft end is angled toward said lower surface.

* * * * *